United States Patent
Cowley et al.

(10) Patent No.: US 9,673,967 B2
(45) Date of Patent: Jun. 6, 2017

(54) SYNCHRONISATION USING PILOTS AND DATA

(71) Applicant: University of South Australia, Adelaide SA (AU)

(72) Inventors: William George Cowley, Adelaide (AU); Robert George McKilliam, Adelaide (AU); Andre Pollok, Adelaide (AU)

(73) Assignee: University of South Australia, Adelaide, South Australia (AU)

( * ) Notice: Subject to any disclaimer, the term of this patent is extended or adjusted under 35 U.S.C. 154(b) by 0 days.

(21) Appl. No.: 14/768,663

(22) PCT Filed: Feb. 19, 2014

(86) PCT No.: PCT/AU2014/000139
§ 371 (c)(1),
(2) Date: Aug. 18, 2015

(87) PCT Pub. No.: WO2014/127407
PCT Pub. Date: Aug. 28, 2014

(65) Prior Publication Data
US 2016/0006558 A1    Jan. 7, 2016

(30) Foreign Application Priority Data
Feb. 19, 2013   (AU) ............................... 2013900552

(51) Int. Cl.
| | |
|---|---|
| *H04L 7/00* | (2006.01) |
| *H04L 27/227* | (2006.01) |
| *H04L 7/04* | (2006.01) |
| *H04L 27/26* | (2006.01) |
| *H04L 27/00* | (2006.01) |

(Continued)

(52) U.S. Cl.
CPC ............ *H04L 7/0087* (2013.01); *H04L 7/042* (2013.01); *H04L 27/2278* (2013.01); *H04L 27/2663* (2013.01); *H04L 27/2671* (2013.01); *H04L 27/2675* (2013.01); *H04L 27/2679* (2013.01); *H04L 1/0054* (2013.01); *H04L 5/0023* (2013.01); *H04L 27/00* (2013.01); *H04L 27/18* (2013.01)

(58) Field of Classification Search
CPC ....... H04L 1/0054; H04L 27/00; H04L 5/023; H04L 27/18
See application file for complete search history.

(56) References Cited

U.S. PATENT DOCUMENTS

| | | | | |
|---|---|---|---|---|
| 7,027,429 | B2* | 4/2006 | Laroia | H04L 27/2659 370/350 |
| 2004/0081205 | A1* | 4/2004 | Coulson | H04L 27/2656 370/503 |
| 2007/0115800 | A1* | 5/2007 | Fonseka | H04L 1/0054 370/208 |

OTHER PUBLICATIONS

J. L. Massey, "Optimum frame synchronization", IEEE Trans. Commun., vol. 20, No. 2, pp. 115-119, 1972.

(Continued)

*Primary Examiner* — Ross Varndell
(74) *Attorney, Agent, or Firm* — McDonnell Boehnen Hulbert & Berghoff LLP

(57) ABSTRACT

A method for estimating a time offset of a transmitted signal which comprises pilot symbols and data symbols, the method comprising: receiving the transmitted signal to produce a received signal; and processing an optimizing function of the received signal at a finite number of possible time offsets to produce an estimator of the time offset.

15 Claims, 11 Drawing Sheets

(51) Int. Cl.
  *H04L 27/18* (2006.01)
  *H04L 1/00* (2006.01)
  *H04L 5/00* (2006.01)

(56) References Cited

OTHER PUBLICATIONS

P. Nielsen, "Some optimum and suboptimum frame synchronizers for binary data in Gaussian noise", IEEE Trans. Commun., vol. 21, No. 6, pp. 770-772, Jun. 1973.
C. Herzet, N. Noels, V. Lottici, H. Wymeersch, M. Luise, M. Moeneclaey, and L. Vandendorpe, "Code-aided turbo synchronization", Proceedings of the IEEE, vol. 95, No. 6, pp. 1255-1271, Jun. 2007.
C. Herzet, H. Wymeersch, M. Moeneclaey, and L. Vandendorpe, "On maximum-likelihood timing synchronization", IEEE Trans. Commun., vol. 55, No. 6, pp. 1116-1119, Jun. 2007.
F. M. Gardner, "Interpolation in digital modems I fundamentals", IEEE Trans. Commun., vol. 41, No. 3, pp. 501-507, Mar. 1993.
L. Erup, F. M. Gardner, and R. A. Harris, "Interpolation in digital modems II implementation and performance", IEEE Trans. Commun., vol. 41, No. 6, pp. 998-1008, Jun. 1993.
R. E. Crochiere and L. R. Rabiner, "Interpolation and decimation of digital signals: A tutorial review", Proceedings of the IEEE, vol. 69, No. 3, pp. 300-331, Mar. 1981.
B. G. Quinn, "Estimating frequency by interpolation using Fourier coefficients", IEEE Trans. Sig. Process., pp. 1264-1268, May 1994.
The International Search Report (ISR) for PCT/AU2014/000139 dated Apr. 17, 2014, pp. 1-4.

\* cited by examiner

SYNCHRONISATION USING PILOTS AND DATA

CROSS-REFERENCE TO RELATED APPLICATIONS

The present application is a U.S. National Phase Application pursuant to 35 U.S.C. §371 of International Application No. PCT/AU2014/000139 filed Feb. 19, 2014, which claims priority to Australian Provisional Patent Application No. 2013900552 filed Feb. 19, 2013. The entire disclosure contents of these applications are herewith incorporated by reference into the present application.

INCORPORATION BY REFERENCE

The following patent application is referred to in the following description:
PCT/AU2013/001464 entitled "Carrier phase and amplitude estimation for phase shift keying using pilots and data" filed on 13 Dec. 2013, claiming priority from Australian Provisional Patent Application No. 2012905489.

The content of this application is hereby incorporated by reference in its entirety.

TECHNICAL FIELD

The present invention relates to communication systems. In particular, the present invention relates to estimation of time offset of a received signal in a communication system.

BACKGROUND

In passband communication systems, a transmitted signal typically undergoes time offset (delay), phase shift, and attenuation (amplitude change). These effects must be compensated for at the receiver.

Estimation of time offset is critical for good receiver performance. The ability to improve the estimation accuracy for this time offset can be translated into a number of valuable benefits, including increased receiver sensitivity, increased power efficiency, a reduction in the amount of overhead required for pilot/training sequences.

A transmitted signal contains pilot symbols and data symbols. Signalling constellations that have symbols on the complex unit circle such as binary phase shift keying (BPSK), quaternary phase shift keying (QPSK) and M-ary phase shift keying (M-PSK) are often used, but more generally, quadrature amplitude modulated (QAM) constellations can also be used.

The problem of estimating time offset has undergone considerable prior research. Traditional approaches involve analogue phase-lock-loops and digital implementations motivated by phase-lock-loops. These approaches focus on estimating $\tau_0$ modulo the symbol period T, that is, if $\tau_0 = \gamma_0 + i_0 T$ where $i_0 \epsilon Z$ and $\gamma_0 \epsilon [-T/2, T/2)$, then an estimator of $\gamma_0$ is given. This estimate may be used to drive a sampling device applied to the received signal (usually after matched filtering). Some other method must then be used to align the samples, i.e., to estimate $i_0$. The problem of estimating $\gamma_0$ is usually called symbol synchronisation, while the second problem of estimating $i_0$ is usually called frame synchronisation.

More recently iterative methods attempting to exploit the error correcting code used by the transmitter have appeared. These estimators typically apply the expectation maximisation (EM) algorithm under a Gaussian assumption regarding the noise w(t). A key problem is that the EM algorithm converges correctly only if initialised at some $\tau$ sufficiently close to $\tau_0$. Methods for efficiently obtaining a $\tau$ close to $\tau_0$ are still required.

SUMMARY

According to a first aspect of the present invention, there is provided a method for estimating a time offset of a transmitted signal which comprises pilot symbols and data symbols, the method comprising: receiving the transmitted signal to produce a received signal; and processing an optimising function of the received signal at a finite number of possible time offsets to produce an estimator of the time offset.

In one form, the optimising function comprises a function of the received signal with a finite number of possible pilots.

In one form, the optimising function comprises a function of the received signal with a finite number of possible data symbols.

In one form, the optimising function comprises a mathematical function, or equivalent, of $SS(\tau)=Z(\tau)+Y(\tau)$ where Z is a function of the received signal, the time offset and positions of a finite number of data symbols, and Y is a function of the received signal, the time offset and positions of a finite number of possible pilot symbols.

In one form, the optimising function is processed at the finite number of possible time offsets $\tau_1, \tau_2, \ldots, \tau_K$ for some positive integer K where $\tau_{i+1}-\tau_i=\Delta$, and $\Delta=T/c$ where T is the symbol period of the pilot symbols and data symbols, and c is a positive integer.

In one form, the data symbols are complex numbers.

In one form, the data symbols are from the complex unit circle.

In one form, the data symbols are from a M-PSK constellation.

In one form, the step of processing an optimising function comprises: computing $b_k$ for all $k=1+c\min(P\cup D), \ldots, K+c\max(P\cup D)$, where P is set of indices describing positions of the pilots symbols, D is set of indices describing positions of the data symbols, K and c are positive integers; computing $Z_k=Z(\tau_k)$, based on $b_k$, for all $k=1, \ldots, K$, where $\tau_k$ an possible time offset; computing $Y_k=Y(\tau_k)$, based on $b_k$, for all $k=1, \ldots, K$, $Y(\tau_k)$ being a different function from $Z(\tau_k)$; computing $k\epsilon\{1, \ldots, K\}$ that maximises $Z_k+Y_k$; computing an approximate time offset estimate, $\bar{\tau}$, based on k that maximises $Z_k+Y_k$; and applying a numerical optimisation procedure initialized with $\bar{\tau}$ to produce the estimator of the time offset.

In one form, the step of computing an approximate time offset estimate comprises: computing $\bar{\tau}=\tau_1+\Delta(\hat{k}-1)=\tau_{min}+\Delta(\hat{k}-1)$, where $\hat{k}$ is the k that maximises $Z_k+Y_k$, $\Delta=T/c$ where T is the symbol period of the pilot symbols and data symbols, and c is a positive integer.

According to second aspect of the present invention, there is provided a computer program product configurable to perform the method of the first aspect, and/or its various forms.

According to third aspect of the present invention, there is provided a receiver configurable to perform the method of the first aspect, and/or its various forms.

According to fourth aspect of the present invention, there is provided a communication system, comprising: a transmitter for transmitting a transmitted signal which comprises pilot symbols and data symbols; and a receiver configurable to perform the method of the first aspect, and/or its various forms.

BRIEF DESCRIPTION OF DRAWINGS

A preferred embodiment of the present invention will be discussed with reference to the accompanying drawings wherein.

In the following description, like reference characters designate like or corresponding parts throughout the figures.

DESCRIPTION OF EMBODIMENTS

A. Overview

Figure 1:
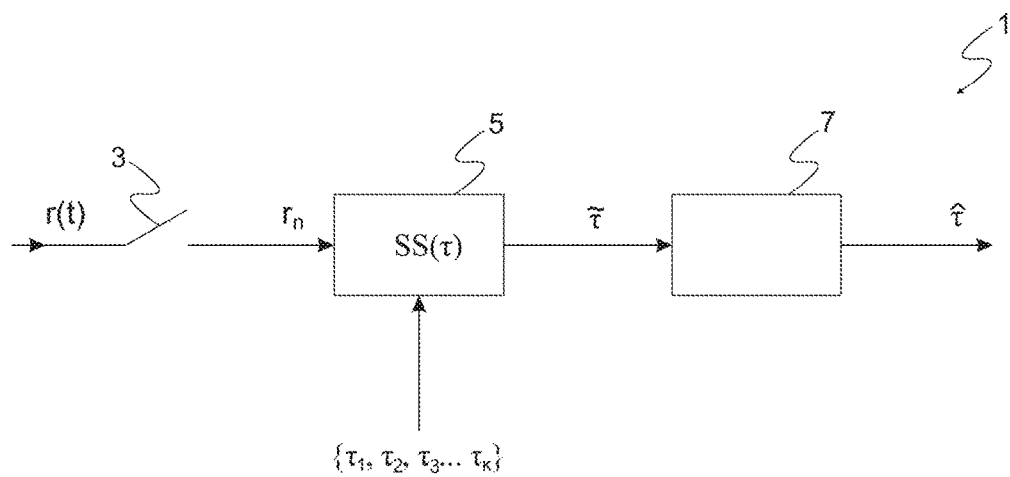
FIG. 1 depicts a block diagram illustrating one embodiment of the present invention.

The present invention relates to estimating the time offset of a transmitted signal, and the description of the present invention treats the phase shift and attenuation of a transmitted signal as nuisance parameters. However, the present invention can be readily applied to any system or receiver which also considers phase shift and attenuation of a transmitted signal together with the time offset.

A transmitted signal may take the (complex baseband) form $$x(t) = \sum_{i \in Z} s_i g(t - iT),$$

where $g(t)$ is the transmit pulse, $T$ is the symbol period, $s_i \in C$ is the i th symbol, and $C$ is the set of complex numbers. Some of the transmitted symbols are pilot symbols known to the receiver and the remainder are information carrying data symbols, with phase that is unknown to the receiver. So, $$s_i = \begin{cases} p_i & i \in P, \\ d_i & i \in D, \\ 0 & \text{otherwise} \end{cases},$$

where $P$ is the set of indices describing the position of the pilot symbols $p_i$, and $D$ is a set of indices describing the position of the data symbols $d_i$. The sets $P$ and $D$ are disjoint, i.e. $P \cap D = \emptyset$ and the union $P \cup D$ contains all those indices where the transmitter is active. The total number of symbols transmitted $L=|P|+|D|$. The transmitted signal can be rewritten as:

$$x(t) = x_p(t) + x_d(t),$$

where $$x_p(t) = \sum_{j \in P} p_j g(t - iT) \text{ and } x_d(t) = \sum_{i \in D} d_i g(t - iT)$$

are the pilot and data portions of the transmitted signal.

It can be assumed that the received signal undergoes time and phase offset, is attenuated by some amount and is also subjected to additive noise. One possible model for the analogue received signal is, $$r(t) = \alpha_0 x(t - \tau_0) + w(t)$$
$$= \alpha_0 x_p(t - \tau_0) + \alpha_0 x_d(t - \tau_0) + w(t)$$

where $\alpha_0 \in X$ is a complex number representing both attenuation and phase offset. $\tau_0$ is the time offset and $w(t)$ is a continuous noise process.

The problem of time offset estimation is made difficult by the fact that the receiver does not know the complex amplitude $\alpha_0$ nor the data symbols.

In practice it is often necessary to also estimate the complex amplitude $\alpha_0$. Given an accurate estimate of time offset (such as the novel estimate in accordance with one or more aspects of the present invention), one can use existing techniques known to a person skilled in the art to estimate $\alpha_0$ after applying a matched filter.

The setting described herein involves a finite number of transmitted symbols, represented by the indices in $P \cup D$. This has been known to a person skilled in the art as packet data transmission or burst-mode transmission. An alternative setting, continuous data transmission, assumes that $P \cup D = Z$, but that the receiver only wishes to process the received signal $r(t)$ inside some finite window of time. The novel estimator described herein can be used in either of these settings. However, for the sake of a clear exposition only packet data transmission is explained in the description below. Extension to other settings is straightforward for someone skilled in the art.

The estimator described herein also combines frame synchronisation and symbol synchronisation into a single operation that estimates the time offset.

FIG. 1 depicts a block diagram 1 illustrating one embodiment of the present invention. This is an overview only and detailed implementations will be presented later. An analogue received signal $r(t)$, which is provided by a receiver (not shown), is sampled by switch 3 to become the digital signal $r_n$. The digital signal $r_n$ is then processed by processing block 5 using a function $SS(\tau)$ where $\tau$ takes the value of a finite number of possible time offsets. For example, the finite number of possible time offsets are $\tau_1, \tau_2, \ldots, \tau_K$ for some positive integer K where $\tau_{i+1} - \tau_i = \Delta$, and $\Delta = T/c$ where T is the symbol period of the pilot symbols and data symbols, and c is a positive integer. The function $SS(\tau)$ is often known as an optimising function, and it can be a minimiser or a maximiser. The optimising function of $SS(\tau)$ over $\tau_1, \tau_2, \ldots \tau_K$ produces an approximation $\tilde{\tau}$ of the true estimator $\hat{\tau}$. To obtain $\hat{\tau}$ from $\tilde{\tau}$, a further refinement process by processing block 7 is in place. However, it is possible that further refinement process by processing block 7 is not necessary depending on the requirement of the accuracy of the time offset. In other words, the approximation $\tilde{\tau}$ may be sufficiently accurate and a further refinement process by processing block 7 is not required.

Figure 2:
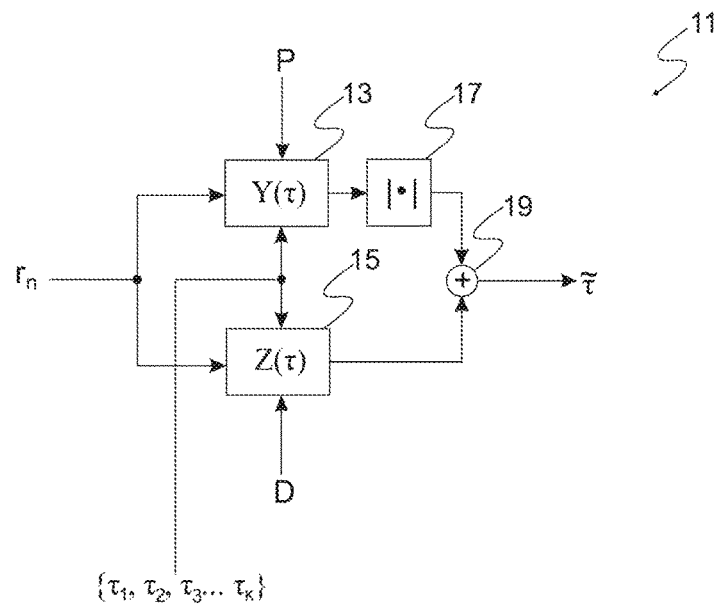
FIG. 2 depicts one embodiment of the function $SS(\tau)$ of FIG. 1.

FIG. 2 depicts a diagram 11 showing one embodiment of the function $SS(\tau)$ of FIG. 1, In this embodiment, the digital signal $r_n$ is processed by functions $Y(\tau)$ 13 and $Z(\tau)$ 15. Function $Y(\tau)$ 13 is computed at $\tau_1, \tau_2, \ldots, \tau_K$. For example, $Y(\tau)$ 13 can be a correlation of $r_n$ and a finite number of possible pilot symbols. $Z(\tau)$ 15 is computed at $\tau_1, \tau_2, \ldots, \tau_K$. For example, $Z(\tau)$ 15 can be a correlation of $r_n$ and a finite number of possible data symbols. In one embodiment as shown, the output of function $Y(\tau)$ 13 is further processed by processing block 17 to produce a modulus of the output of function $Y(\tau)$. The modulus is then combined by combiner 19 with the output of function $Z(\tau)$ 15 to produce. In another embodiment, the output of function $Y(\tau)$ 13 can be combined with the output of function $Z(\tau)$ 15 to produce $\tilde{\tau}$. In a general form, maximising a linear combination of $Y(\tau)$ 13 and $Z(\tau)$ 15 produces $\tilde{\tau}$.

Figure 3:
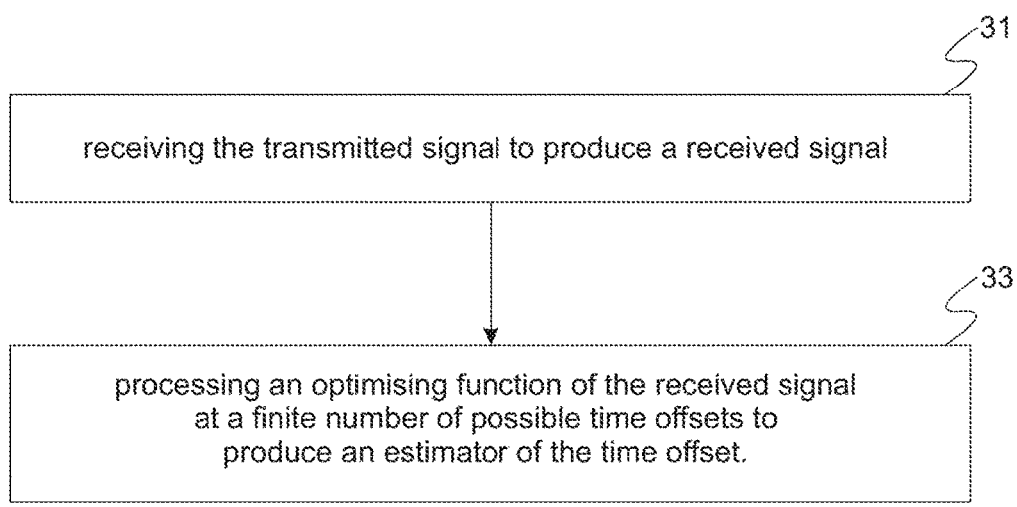
FIG. 3 summarises steps involved in performing the present invention.

FIG. 3 summarises steps involved in performing the present invention. In particular, to estimate a time offset of a transmitted signal which comprises both pilot symbols and data symbols, the present invention includes step 31 of firstly receiving the transmitted signal to produce a received signal. This is then followed by step 33 of processing, an optimising function of the received signal at a finite number of possible time offsets to produce an estimator of the time offset.

A receiver which includes the functions described with respect to FIG. 1 can take various forms deemed suitable by a person skilled in the art. The receiver can also be part of a communication system, which also includes a corresponding transmitter. Further, the functions may be stored as instructions in a computer readable medium, such as a non-transitory processor readable medium (e.g. hard disk, Flash memory, optical disk (CDROM, DVD), etc.) for causing a processor to implement the functions.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this inter-changeability of hardware and software, various illustrative components, blocks, modules, circuits, and steps have been described above generally in terms of their functionality. Whether such functionality is implemented as hardware or software depends upon the particular application and design constraints imposed on the overall system. A person skilled in the art may implement the described functionality in varying ways for each particular application, but such implementation decisions should not be interpreted as causing a departure from the scope of the present invention. For example, the invention herein described may be implemented in ground-satellite communication, mobile device communications etc. In fact, cost aside, the invention described herein can be applied to any form of communication equipment.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. A central processing unit (CPU) may be used, containing an Input/Output Interface, an Arithmetic and Logic Unit (ALU) and a Control Unit and Program Counter element which is in communication with input and output devices or modules through the Input/Output Interface, and a memory. Software modules, also known as computer programs, computer codes, or instructions, may contain a number a number of source code or object code segments or instructions, and may reside in any computer or processor readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

The newly developed estimator of the time offset of a transmitted communications signal contains both pilot symbols, known to the receiver, and data symbols, unknown to the receiver. A number of different algorithms is derived for computing the estimator, that work under the assumption that the transmit pulse has finite duration. Faster algorithms are available if the symbol rate is rationally related to the sample rate, and even faster algorithms exist if the data symbols are arranged in a small number of contiguous blocks. Some of the algorithms require a number of operations that grows only linearly with the number of transmitted symbols. Monte Carlo simulations with the new estimator are also presented. The simulations show that the new estimator performs substantially better than the estimator that correlates the received signal with the pilot signal, ignoring the data symbols. The simulations also suggest that when the signal to noise ratio is sufficiently high, the new estimator performs similarly to the estimator that results when all of the transmitted symbols are known a priori at the receiver. The new estimator performs favourably when compared to the estimator that combines the symbol timing estimator of "Oerder-Meyr" (see M. Oerder and H. Meyr, "Digital Filter and square timing recovery" IEEE Trans. Commun., vol. 36, no. 5, pp. 605-612, May 1988) with the frame synchronisation algorithm of "Massey" (see J. L. Massey, "Optimum frame synchronization", IEEE Trans. Commun., vol. 20, no. 2, pp. 115-119, 1972). This is particularly the case with bandwidth efficient transmit pulses, such as root raised cosines with small roll-off.

B. The Estimator

The received signal is sampled to obtain $$r_n = r(nT_s) = w_n + \alpha_0 x(T_s n - \tau_0) \quad (1)$$
$$= w_n + \alpha_0 \sum_{i \in Z} g(T_s n - Ti - \tau_0) s_i,$$

where n is an integer and $T_s$ is the sampling period and $\{w_n, n \in Z\}$ is a sequence of noise variables. This model for the sampled signal assumes instantaneous sampling. This is a reasonable approximation for highly oversampled signals, i.e. when $$\frac{1}{T_s}$$

is large compared to the bandwidth of g(t). If this instantaneous sampling assumption is not valid, but the sampling device can be reasonably modelled by a linear time-invariant system with impulse response $g_s(t)$, then the effect of sampling can be included by replacing g(t) with the convolution of g(t) and $g_s(t)$, i.e., by replacing g(t) with $$g_s(t) * g(t) = \int_{-\infty}^{\infty} g(v) g_s(t-v) dv.$$

The objective function is defined as $$SS(\tau) = Y(\tau) + Z(\tau)$$

where $$Y(\tau) = f_1\left(\sum_{i \in P} f_2(p_i^* \langle r(t), g(t - iT - \tau) \rangle)\right) \quad (2)$$

and $$Z(\tau) = g_1\left(\sum_{i \in D} g_2(\langle r(t), g(t - iT - \tau) \rangle)\right) \quad (3)$$

where the inner product $$\langle r(t), g(t - iT - \tau) \rangle = \sum_{n \in Z} r(nT_s) g^*(T_s n - Ti - \tau)$$

and * denotes complex conjugates and where $f_1, f_2, g_1$ and $g_2$ are functions that are free to be chosen. The algorithms described herein apply for any choice of $f_1, f_2, g_1$ and $g_2$, but to keep the notation clean and the discussion simpler, it is set $$f_1(x) = |x|, f_2(x) = x, g_1(x) = x, g_2(x) = |x| \quad (4)$$

in what follows, where |x| denotes the complex magnitude. In this case $$Y(\tau) = \left|\sum_{i \in P} p_i^* \langle r(t), g(t - iT - \tau) \rangle\right| \quad (5)$$

and $$Z(\tau) = \sum_{i \in D} |\langle r(t), g(t - iT - \tau) \rangle|. \quad (6)$$

This choice is motivated by least squares statistical methodology, but it may be that other choices of $f_1, f_2, g_1$ and $g_2$ are good in certain situations. The present invention applies for all functions $f_1, f_2, g_1$ and $g_2$.

The estimator operates on the sampled signal directly. There is no need for resampling or interpolation as common in known call-digital receiver implementations. The process of 'interpolation' is built into the inner products in (7) to be described. What is assumed is that the transmit pulse, i.e. the function g: P ↦ P, is known, and computable at the receiver. If it is computationally complex to compute g(t) for any given t then it may be advantageous to pre-compute g on a fine grid, and store the values in a lookup table, Simple interpolation (for example linear interpolation) can then be used based on the values in the table. This can be made as accurate as desired by appropriately choosing the size of the lookup table.

C. Computing the Estimator

In this section, practical algorithms for computing the minimiser of SS given the discrete received sequence $\{r_n, n \in Z\}$ from (1) are described. To compute $SS(\tau)$ for a particular $\tau$, it is necessary to compute both $Y(\tau)$ and $Z(\tau)$. Both Y and Z contain inner products of the form $$\langle r(t), g(t - iT - \tau) \rangle = \sum_{n \in Z} r(nT_s) g^*(T_s n - Ti - \tau)$$
$$= \sum_{n \in Z} r_n g^*(T_s n - Ti - \tau)$$

and these infinite sums cannot be computed in practice. To alleviate this, it is assumed that the transmit pulse g(t) has finite duration, that is g(t) is nonzero only for t in some interval $[t_{min}, t_{max}]$. In this case the inner product can be computed by the finite sum $$\langle r(t), g(t - iT - \tau) \rangle = \sum_{n \in G} r_n g^*(T_s n - Ti - \tau), \quad (7)$$

where $$G = \{n \in Z | T_s n - Ti - \tau \in [t_{min}, t_{max}]\}.$$

This assumption is reasonable in practical systems that make use of truncated transmit pulses.

Another assumption made is that the time offset $\tau_0$ is known to lie in some compact interval $[\tau_{min}, \tau_{max}]$ of P. This estimator is then the minimiser of $SS(\tau)$ over this interval, $$\hat{\tau} = \arg \max_{\tau \in [\tau_{min}, \tau_{max}]} S(\tau).$$

A result of these assumptions is that the receiver only requires those values of $r_n$ within which the signal can reside. That is, only for n satisfying $A \leq n \leq B$ where $$A = \left\lceil \frac{t_{min} + \tau_{min} + T\min(P \cup D)}{T_s} \right\rceil,$$

$$B = \left\lceil \frac{t_{max} + \tau_{max} + T\max(P \cup D)}{T_s} \right\rceil,$$

and where $\min(P \cup D)$ and $\max(P \cup D)$ denote the minimum and maximum symbol indices, and $\lceil \cdot \rceil$ and $\lfloor \cdot \rfloor$ denote the smallest integer greater than or equal to, and the largest integer less than or equal to their arguments. In this way, the receiver only need observe a finite number of elements $\{r_n, A \leq n \leq B\}$.

To compute $\hat{\tau}$, SS is first computed on a finite uniform grid of values $$\tau_1, \tau_2, \ldots, \tau_K$$

for some positive integer K where $\tau_{i+1} - \tau_i = \Delta$, and $\Delta = T/c$ is a fraction of the symbol period, and c is a positive integer. Then $$\tau_1 = \tau_{min} \text{ and } \tau_K = \left\lfloor \frac{\tau_{max}}{\Delta} \right\rfloor \Delta,$$

so that the grid is spaced over the interval $[\tau_{min}, \tau_{max}]$ and $$K = \left\lfloor \frac{\tau_{max} - \tau_{min}}{\Delta} \right\rfloor + 1.$$

Efficient algorithms for computing all of $SS(\tau_1), \ldots, SS(\tau_K)$ will be described. Provided that $\Delta$ is chosen sufficiently small (equivalently c is chosen sufficiently large) the grid point that minimises SS, denoted by $\tilde{\tau}$, is a good approximation of the true minimiser $\hat{\tau}$. An optimisation procedure, initialised at $\tilde{\tau}$, can then be used to obtain $\hat{\tau}$. Practical optimisation procedures are discussed in section G. For now, the focus is on computing the approximation $\tilde{\tau}$.

To compute all of $SS(\tau_1), \ldots, SS(\tau_K)$ one needs to compute all of $Y(\tau_1), \ldots, Y(\tau_K)$ and all of $Z(\tau_1), \ldots, Z(\tau_K)$. A naïve approach is to directly compute $Y(\tau_1), \ldots, Y(\tau_K)$ and $Z(\tau_1), \ldots, Z(\tau_K)$ using formula (5) and (6) (or (2) and (3) for general $f_1, f_2, g_1$ and $g_2$).

The following sections describe a much faster algorithm for computing all of $SS(\tau_1), \ldots, SS(\tau_K)$. This algorithm requires that the sample period $T_s$ is rationally related to the symbol period T, i.e., $$T_s = \frac{p}{q} T$$

where p and q are relatively prime integers. This assumption can always be made an accurate approximation by an appropriate choice of p and q. The algorithm is described under the assumption that $f_1, f_2, g_1$ and $g_2$ are chosen according to (4), however it is trivial to modify the algorithms so that they work for any choice of the functions $f_1, f_2, g_1$ and $g_2$.

D1. Computing $Z(\tau_1), \ldots, Z(\tau_K)$

Write $$\Delta = \frac{T}{c} = \frac{q}{pc} T_s = \frac{b}{a} T_s$$

where a and b are relatively prime positive integers such that $$\frac{q}{pc} = \frac{b}{a}. \text{ For } l = 0, \ldots, b-1, \text{ let}$$

$$g_{l,n} = g^* \left( -(n-1)\frac{b}{a} T_s - \tau_{min} + \frac{l}{a} T_s \right)$$

$$= g^* \left( -(n-1)\Delta - \tau_1 + \frac{l}{a} T_s \right),$$

so that $$g_{l,k-n+ic} = g^* \left( n\Delta - iT - \tau_k + \frac{l}{a} T_s \right).$$

Let $$z_n = \begin{cases} r_{n/a} & n/a \in \mathbb{Z} \\ 0 & \text{otherwise} \end{cases} \tag{8}$$

be a zero filled version of $r_n$ and let $$z_{l,n} = z_{bn+l}.$$

Put $Z_k = Z(\tau_k)$ so that, $$Z_k = \sum_{i \in D} |\langle r(t), g(t - iT - \tau_k) \rangle| \tag{9}$$

$$= \sum_{i \in D} \left| \sum_{n \in \mathbb{Z}} r_n g^*(nT_s - iT - \tau_k) \right|$$

$$= \sum_{i \in D} \left| \sum_{n \in \mathbb{Z}} z_{an} g^*(nT_s - iT - \tau_k) \right|$$

$$= \sum_{i \in D} \left| \sum_{n \in \mathbb{Z}} z_n g^* \left( n\frac{1}{a} T_s - iT - \tau_k \right) \right|,$$

where the last line follows since $z_n = 0$ whenever n is not a multiple of a. Now, $$Z_k = \sum_{i \in D} \left| \sum_{n \in \mathbb{Z}} \sum_{l=0}^{b-1} z_{bn+l} g^* \left( n\frac{b}{a} T_s + \frac{l}{a} T_s - iT - \tau_k \right) \right| \tag{10}$$

$$= \sum_{i \in D} \left| \sum_{l=0}^{b-1} \sum_{n \in \mathbb{Z}} z_{l,n} g^* \left( n\Delta - iT - \tau_k + \frac{l}{a} T_s \right) \right|$$

$$= \sum_{i \in D} \left| \sum_{l=0}^{b-1} \sum_{n \in \mathbb{Z}} z_{l,n} g_{l,k-n+ci} \right|$$

$$= \sum_{i \in D} \left| \sum_{l=0}^{b-1} h_{l,k+ci} \right|$$

$$= \sum_{i \in D} |b_{k+ci}|,$$

where $$h_{\ell,k} = \sum_{n \in Z} z_{l,n} g_{l,k-n} \quad (11)$$

is the convolution of the sequence $\{z_{l,n},\ n \in Z\}$ with the sequence $\{g_{l,n},\ n \in Z\}$ and $$b_k = \sum_{l=0}^{b-1} h_{\ell,k}. \quad (12)$$

A person skilled in the art familiar with multi-rate systems and filter banks will recognise (9) to (10) as similar to the derivation of a polyphase filter. The $h_{l,k}$ corresponds with the individual filter banks. The computational complexity of our algorithms do depend on the fraction $$\frac{p}{q},$$

but this structure ensures that the complexity will not depend on the magnitude of either p or g individually. This is desirable. It is not desirable for the algorithms to be fast when, say $$\frac{p}{q} = \frac{1}{4},$$

but slow when, say $$\frac{p}{q} = \frac{1001}{4000}.$$

To compute all of $Z_1, \ldots, Z_K$ the values of $b_k$ for $k=1+\text{cmin}(D), \ldots, K+\text{cmax}(D)$ are required, where $\max(D)$ and $\min(D)$ are the largest and smallest elements in D. To compute each $b_k$ the value of $h_{l,k}$ for $l=0, \ldots, q-1$ is required. Methods for computing $h_{l,k}$ are considered in subsections D3. The required values of $b_k$ can be computed and stored so that accessing any $b_k$ requires constant time.

In many practical scenarios it is the case that the data symbols occur in a small number of contiguous blocks, and in this case a faster algorithm exists. The algorithm for the case when the data symbols occur in a single contiguous block will be described, that is $$D=\{\min(D), \min(D)+1, \ldots, \max(D)\}.$$

For each $k=0, \ldots, c-1$ one can compute $Z_k = \sum_{i \in D} |b_{k+ci}|$ using $O(|D|)$ operations and, because the data symbols are in a contiguous block, $$Z_{k+c} = \sum_{i \in D} |b_{k+c}(i+1)|$$
$$= Z_k - |b_{k+c\min(D)}| + |b_{k+c\max(D)+c}|$$

and so $Z_k, Z_{k+c}, Z_{k+2c}, \ldots$ satisfy the recursion $$Z_{k+(m+1)c} = Z_{k+mc} - |b_{k+mc+c\min(D)}| + |b_{k+mc+c\max(D)+c}|.$$

Each of $Z_1, \ldots, Z_{c-1}$ can be computed using (5) and the remaining elements $Z_c, \ldots, Z_K$ can be computed using the recursion above. A similar approach applies when the data symbols occur in a small number of contiguous blocks. A similar recursive procedure (not described here) can be readily developed by a person skilled in the art if the data symbols occur in a small number of separate contiguous blocks.

D2. Computing $Y(\tau_1), \ldots, Y(\tau_K)$

Let $b_k$ be defined as in (12) and put $Y_k = Y(\tau_k)$. By working analogous to that from (9) to (10), $$Y_k = \sum_{i \in P} p_i^* \langle r(t), g(t - iT - \tau_k) \rangle$$
$$= \sum_{i \in P} p_i^* \sum_{n \in Z} r_n g^*(nT_s - iT - \tau_k)$$
$$= \sum_{i \in P} p_i^* b_{k+ci}.$$

To compute all of $Y_1, \ldots, Y_K$ we require $b_k$ for $k=1+\text{cmin}(P), \ldots, K+\text{cmax}(P)$. As in the previous subsection, the required values of $b_k$ can be computed and stored so that accessing them requires constant time D3. Computing $b_k$ and $h_{l,k}$ During the previous subsections it is assumed that certain values of $b_k$ had already been computed, and this subsection describes how to perform these computations efficiently. To compute $b_k$ it is necessary to compute:

$$h_{\ell,k} = \sum_{n \in Z} z_{l,n} g_{l,k-n}, \text{ for all } l = 0, \ldots, b-1$$

Since $g(t)$ is nonzero only when $t \in [t_{min}, t_{max}]$ then $g_{l,n}$ is nonzero only if $$-(n-1)\Delta - \tau_1 + \frac{\ell}{n} T_s \in [t_{min}, t_{max}],$$

that is, only if $A' \leq n \leq B'$ where $$A' = 1 - \frac{t_{max} + \tau_1}{\Delta} + \frac{l}{b} \text{ and } B' = 1 - \frac{t_{min} + \tau_1}{\Delta} + \frac{l}{b} \text{ and}$$

$$\frac{l}{a\Delta} T_s = \frac{l}{b}.$$

Now $h_{l,k}$ can be expressed as the finite sum $$h_{l,k} = \sum_{n \in G'} z_{l,n} g_{l,k-n}$$

where $G'=\{n | A' \leq k-n \leq B'\}$. Since $z_{l,n}=z_{bn+l}$ nonzero only for those integers n satisfying $bn+l \equiv 0 \pmod{a}$, the sum above can be further simplified to $$h_{l,k} = \sum_{n \in G''} z_{l,n} g_{l,k-n}, \quad (13)$$

where $G''=\{n \in G' | bn+l \equiv 0 \pmod{a}\}$. Since a and b are relatively prime, there exist integers $n_0$ and $m_0$ such that $bn_0+am_0=1$. Both $n_0$ and $m_0$ can be computed using the extended Euclidean algorithm. Now $lbn_0 \equiv l \pmod{a}$ and $$G''=\{ma-ln_0 | m=B'',B''+1,\ldots,A''\}$$

where $$B'' = \left\lceil \frac{k-B'+ln_0}{a} \right\rceil,$$

$$A'' = \left\lfloor \frac{k-A'+ln_0}{a} \right\rfloor.$$

E. Summary of the Algorithm

Figure 4:
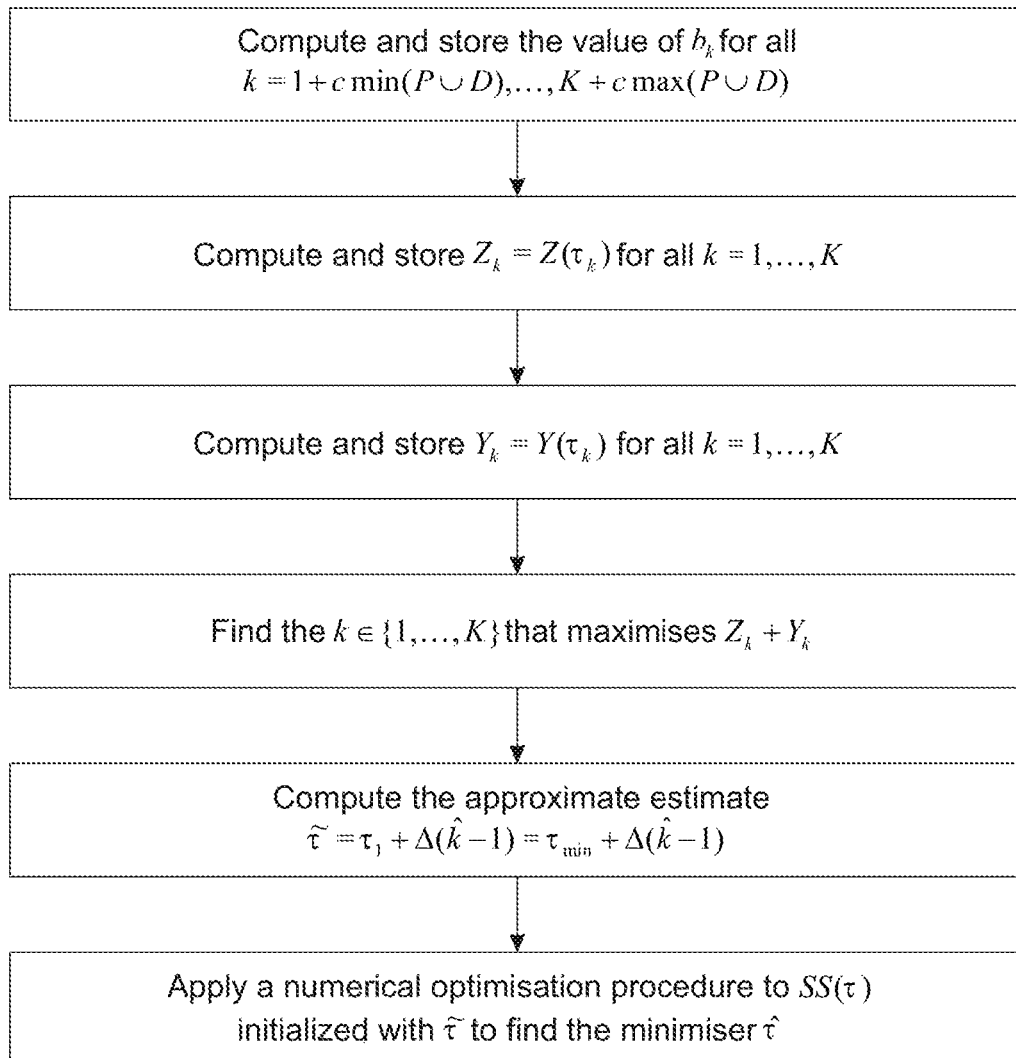
FIG. 4 depicts steps which present the novel time offset estimation algorithm of one embodiment of the present invention.
Figure 5:
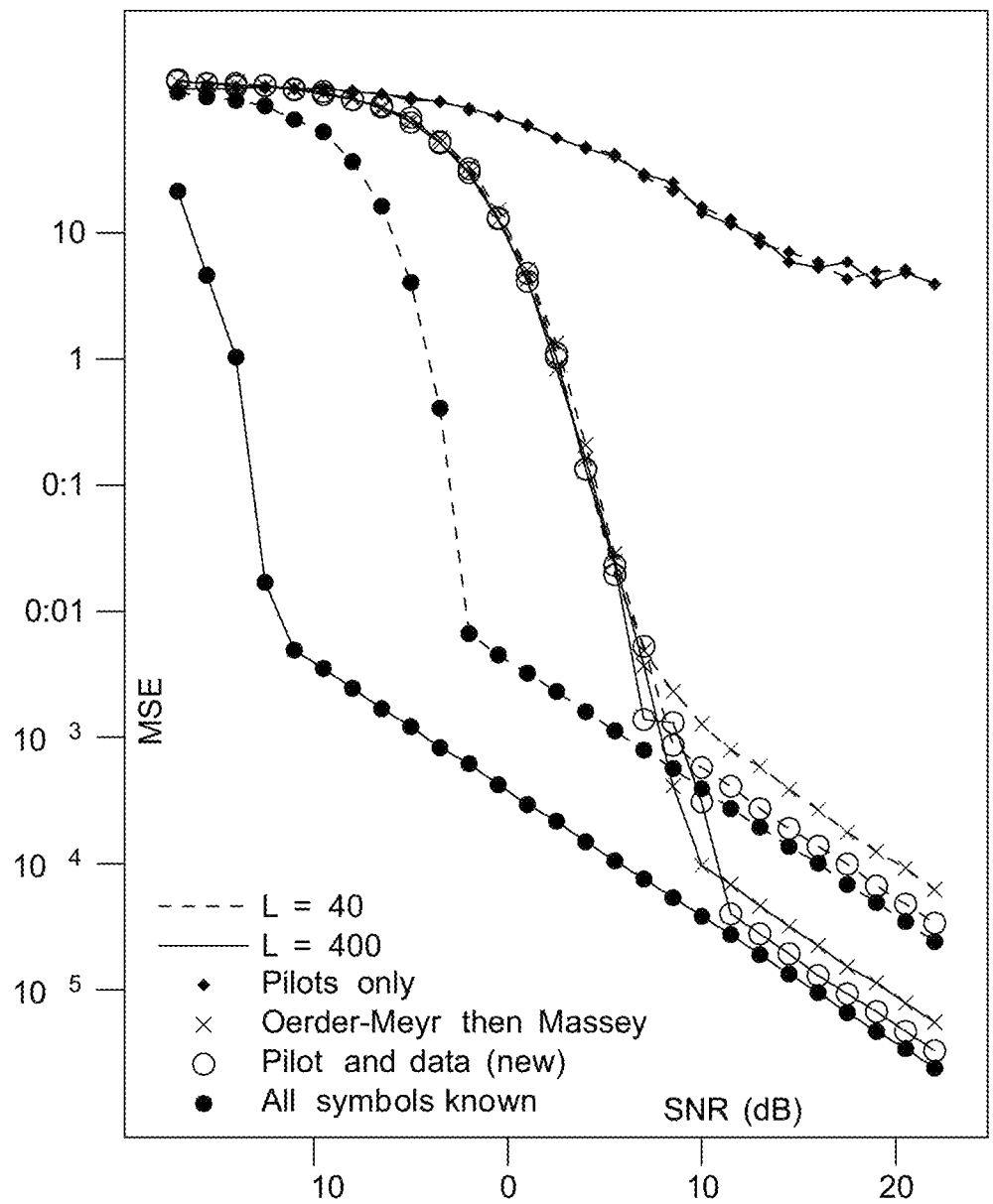
FIG. 5 depicts Mean Square Error (MSE) versus Signal to Noise Ratio (SNR) with |P|=5 and root-raised cosine (RRC) pulse with roll-off ⅓.
Figure 6:
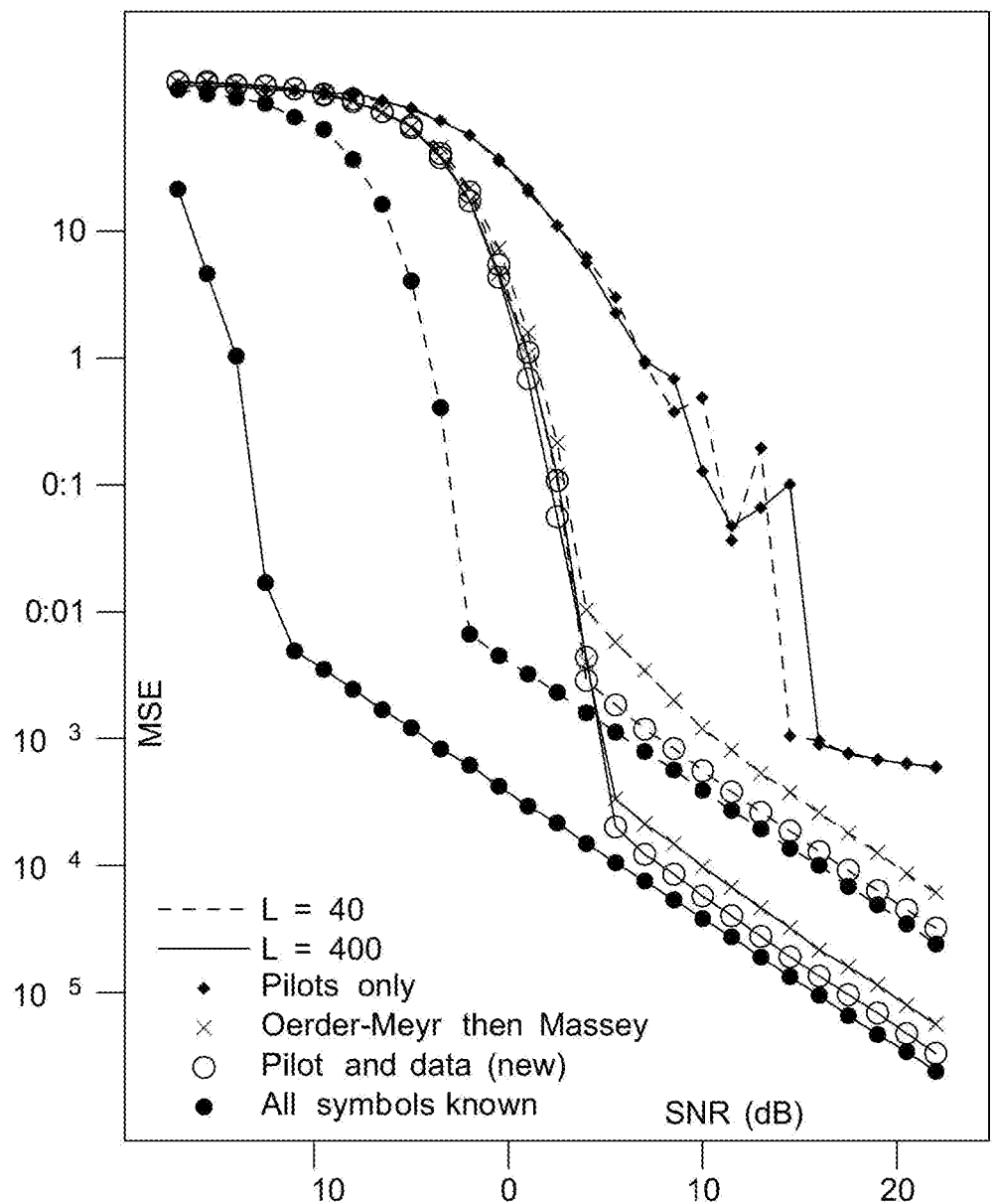
FIG. 6 depicts Mean Square Error (MSE) versus Signal to Noise Ratio (SNR) with |P|=10 and root-raised cosine (RRC) pulse with roll-off ⅓.
Figure 7:
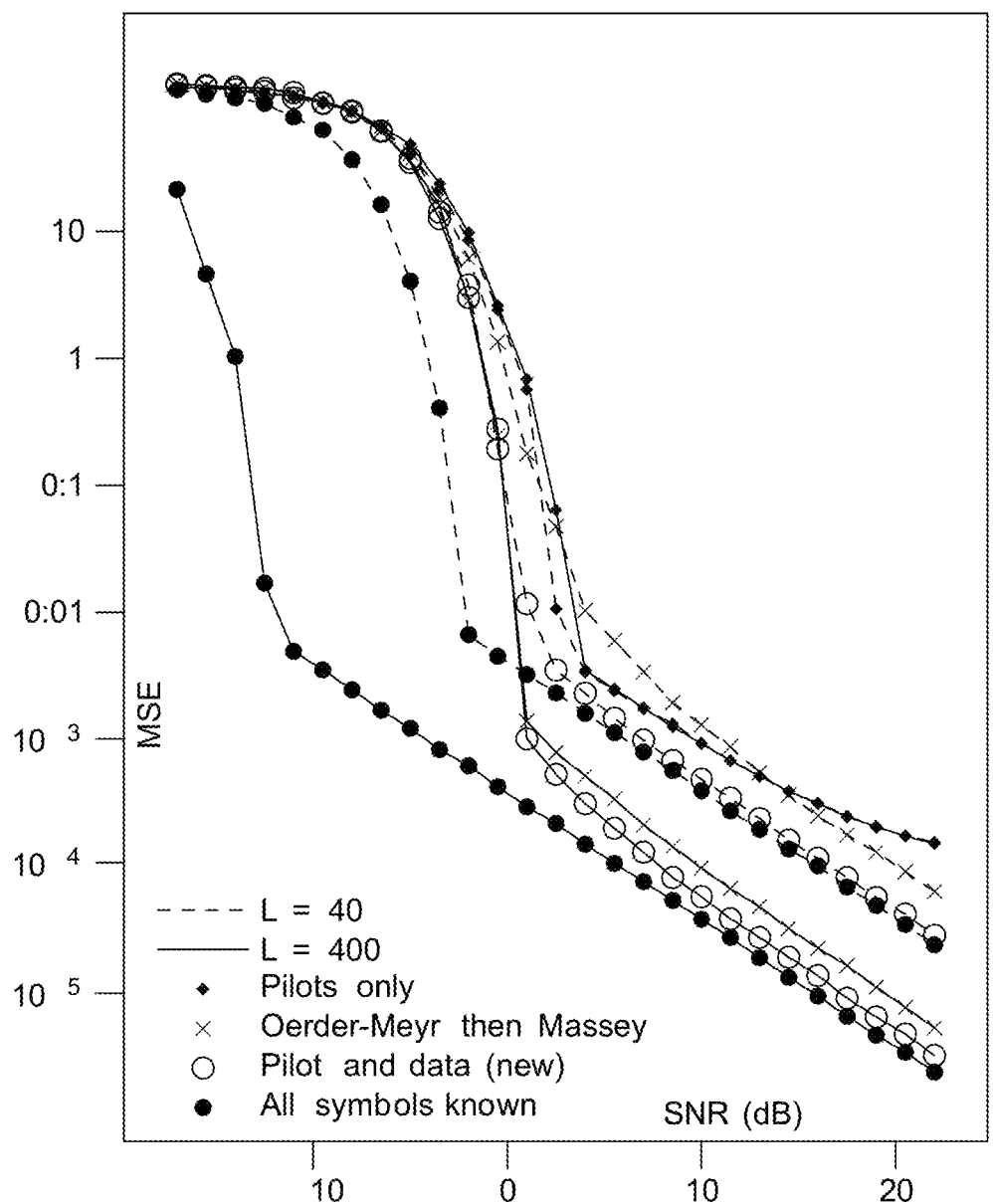
FIG. 7 depicts Mean Square Error (MSE) versus Signal to Noise Ratio (SNR) with |P|=20 and root-raised cosine (RRC) pulse with roll-off ⅓.
Figure 8:
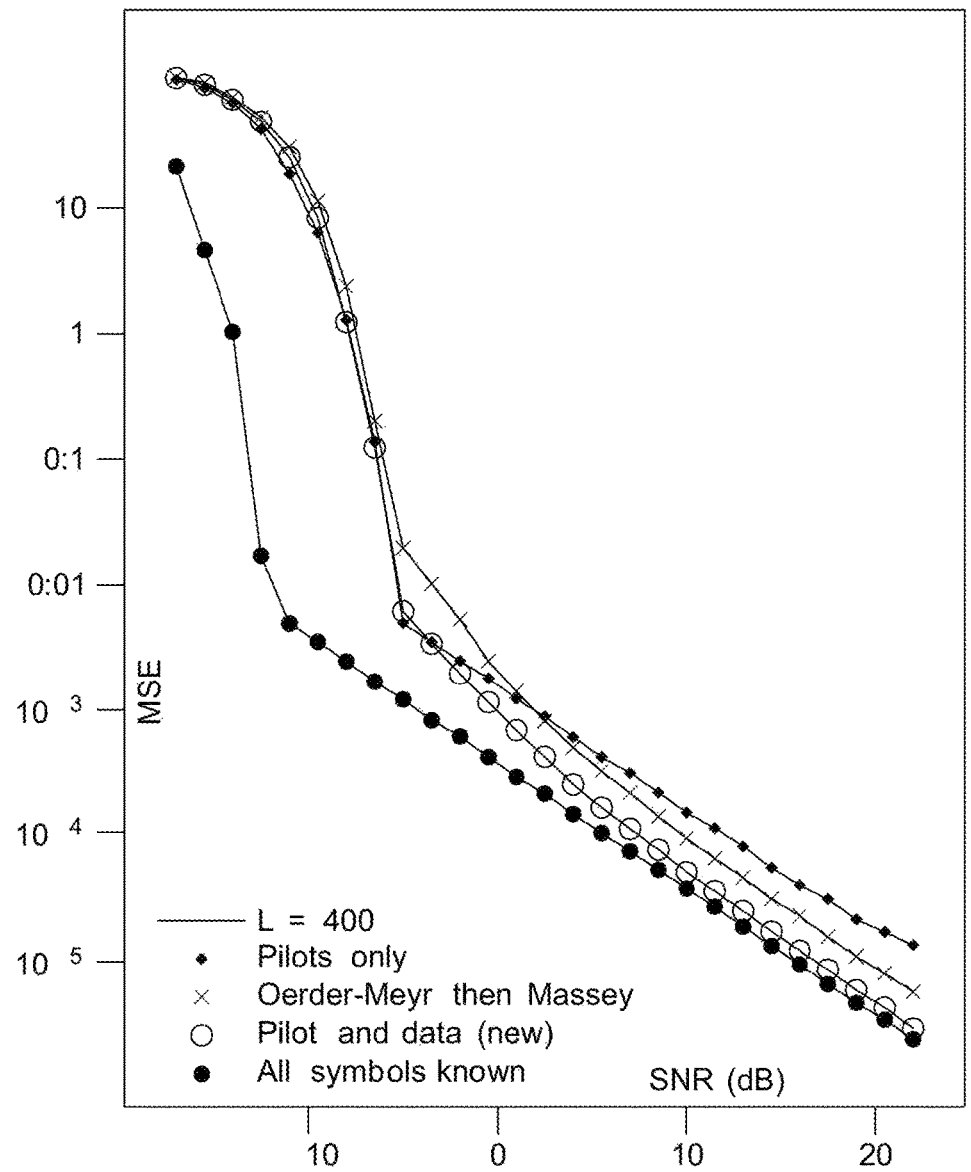
FIG. 8 depicts Mean Square Error (MSE) versus Signal to Noise Ratio (SNR) with |P|=100 and root-raised cosine (RRC) pulse with roll-off ⅓.
Figure 9:
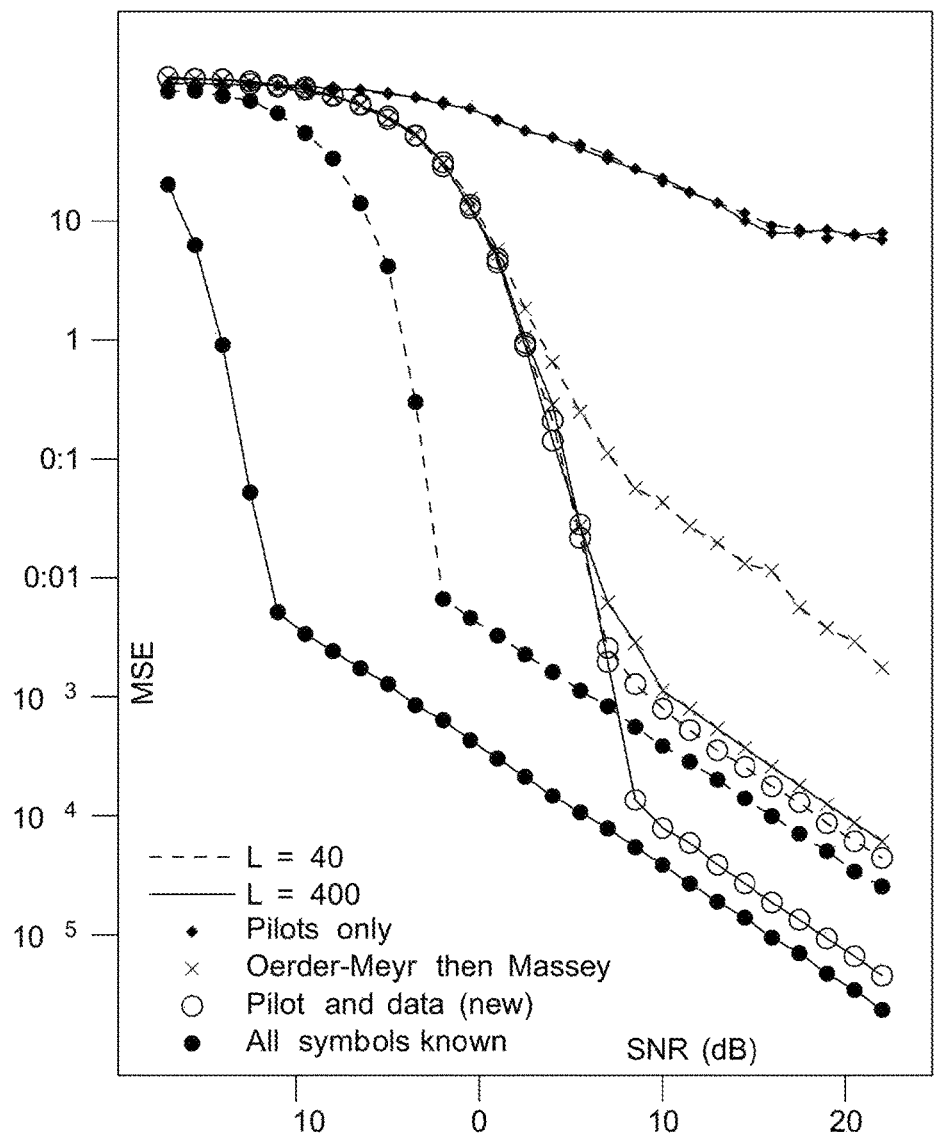
FIG. 9 depicts Mean Square Error (MSE) versus Signal to Noise Ratio (SNR) with |P|=5 and root-raised cosine (RRC) pulse with roll-off 1/30.
Figure 10:
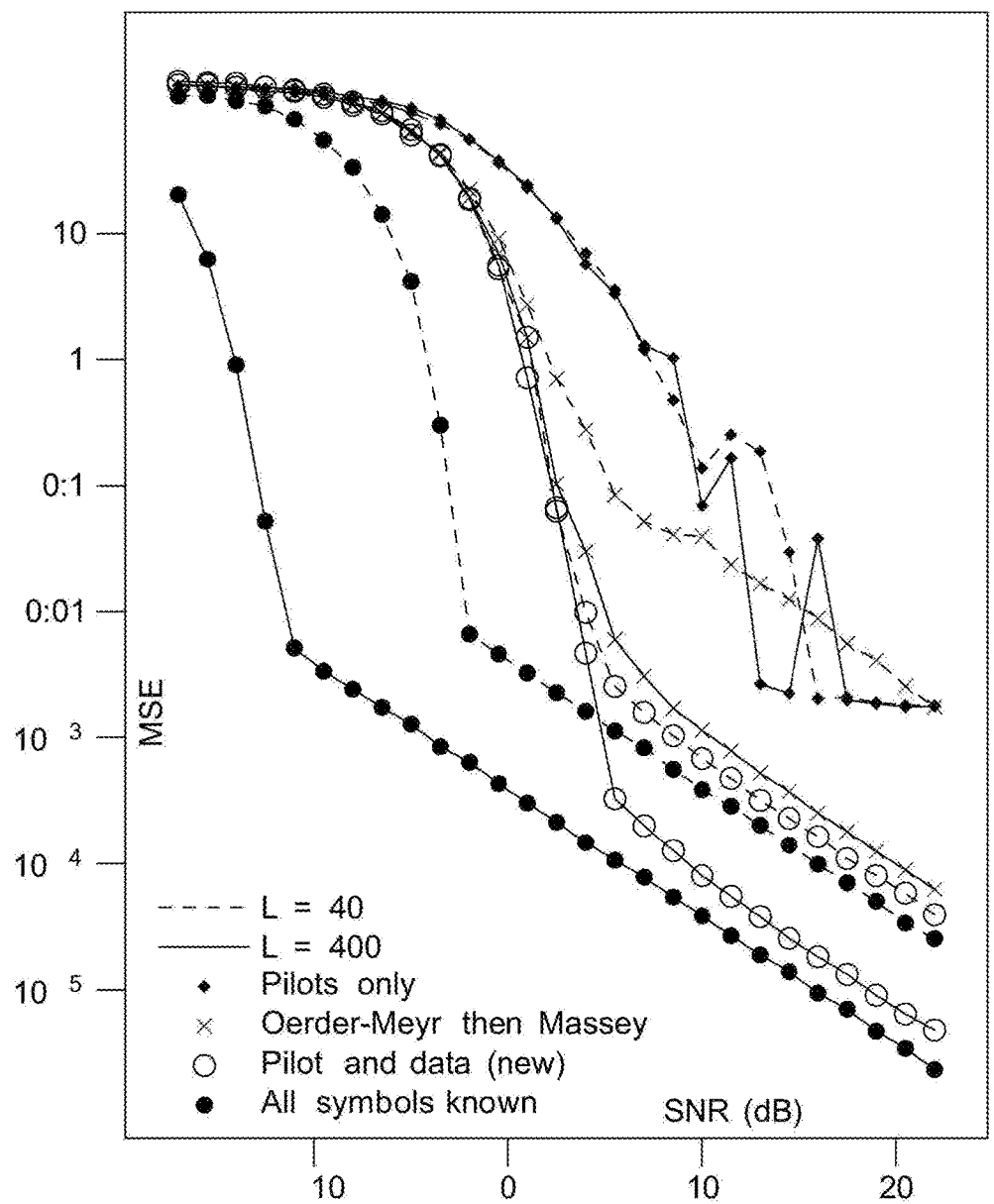
FIG. 10 depicts Mean Square Error (MSE) versus Signal to Noise Ratio (SNR) with |P|=10 and root-raised cosine (RRC) pulse with roll-off 1/30.
Figure 11:
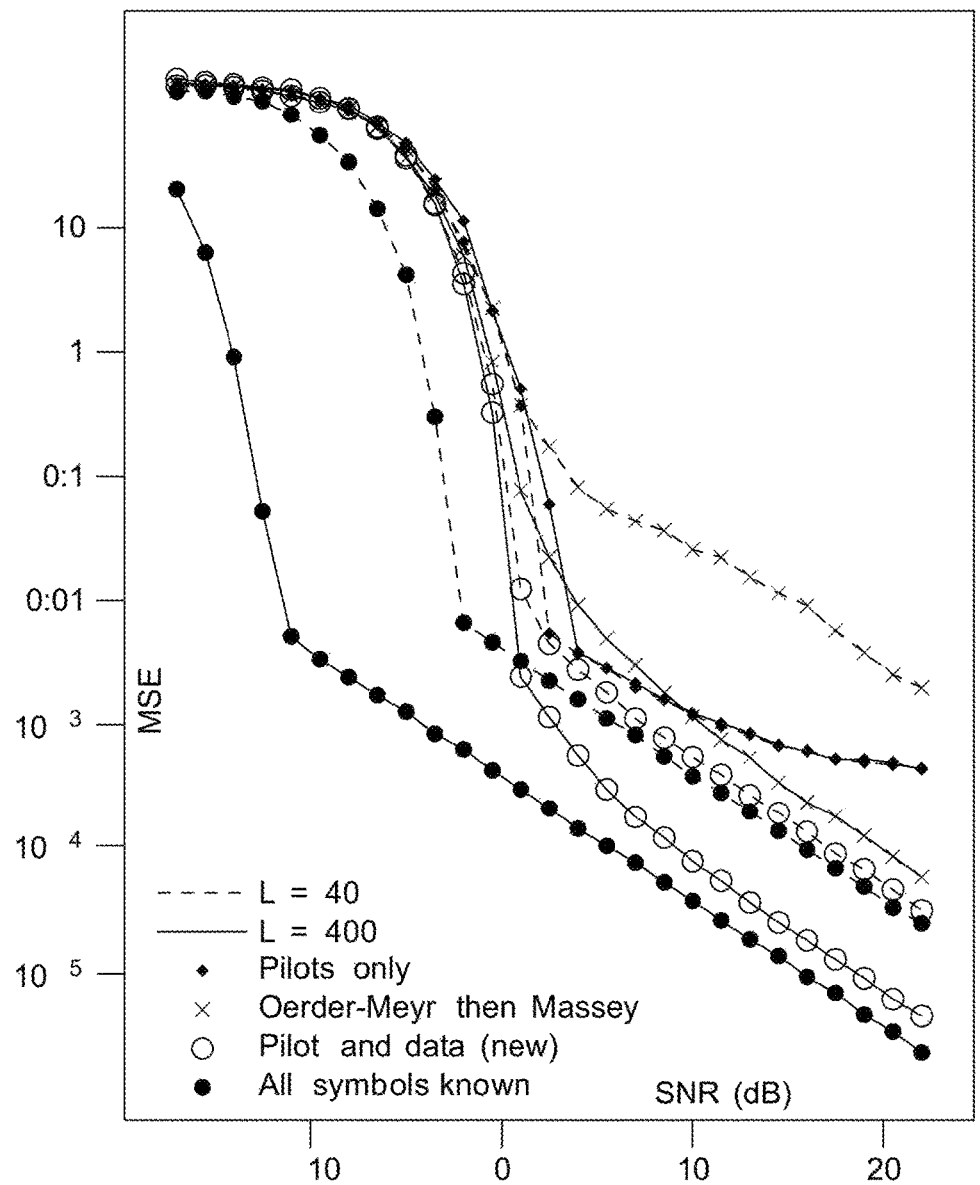
FIG. 11 depicts Mean Square Error (MSE) versus Signal to Noise Ratio (SNR) with |P|=20 and root-raised cosine (RRC) pulse with roll-off 1/30.
Figure 12:
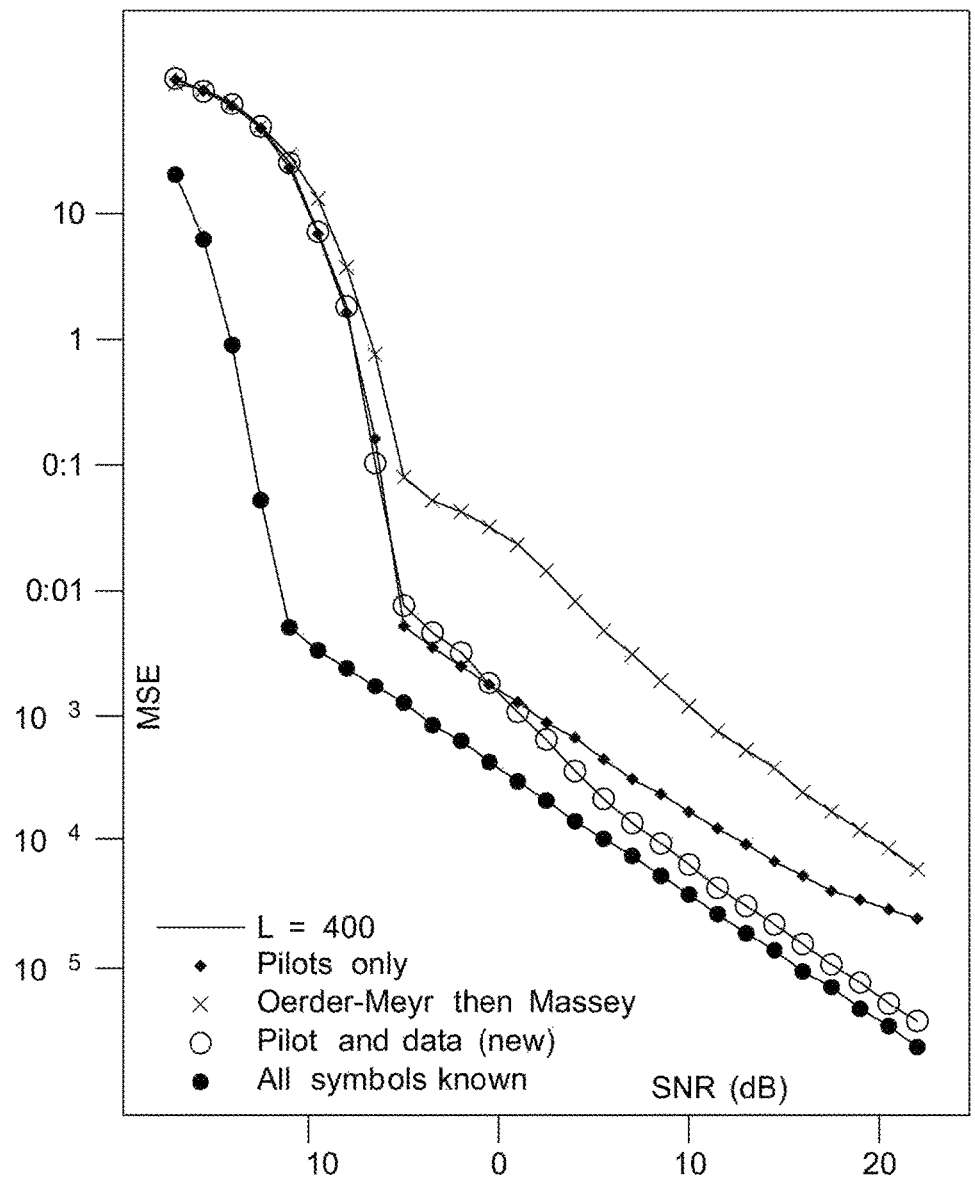
FIG. 12 depicts Mean Square Error (MSE) versus Signal to Noise Ratio (SNR) with |P|=100 and root-raised cosine (RRC) pulse with roll-off 1/30.

FIG. 4 depicts the following steps which present the novel time offset estimation algorithm of one embodiment of the present invention. The maximisation in Step 4 is straightforward, and the optimisation in Step 6 can use any one of a number of numerical optimisation procedures that are known to someone skilled in the art. One particular example is given in Section F.

STEP 1: Compute and store the value of $b_k$ for all $$k=1+c\min(P \cup D),\ldots,K+c\max(P \cup D).$$

Each $b_k$ can be efficiently computed using (12) and the algorithm described in subsection D3.

STEP 2: Compute and store $Z_k=Z(\tau_k)$ for all $k=1,\ldots,K$ using either the direct or recursive procedures described in subsection D1.

STEP 3: Compute and store $Y_k=Y(\tau_k)$ for all $k=1,\ldots,K$ using the procedures described in subsection D2.

STEP 4: Find the $k \in \{1,\ldots,K\}$ that maximises $Z_k+Y_k$, that is, compute $$\hat{k} = \arg\max_{k=1,\ldots,K}(Z_k+Y_k).$$

STEP 5: Compute the approximate estimate $$\tilde{\tau}=\tau_1+\Delta(\hat{k}-1)=\tau_{min}+\Delta(\hat{k}-1).$$

STEP 6: Apply a numerical optimisation procedure to $SS(\tau)$ initialized with $\tilde{\tau}$ to find the minimiser $\hat{\tau}$. Section G describes an implementation of Brent's method for this purpose (see R. P. Brent, Algorithms for Minimization without Derivatives, Prentice-Hall, Englewood Cliffs, N.J., 1973).

F. Obtaining $\hat{\tau}$ from $\tilde{\tau}$

In the previous section methods for computing $\tilde{\tau}$, the minimiser of SS over the grid $\tau_1,\ldots,\tau_K$ are described. This serves as an approximation of $\hat{\tau}$, the true minimiser of SS. Methods for obtaining $\hat{\tau}$ from $\tilde{\tau}$ are no discussed. Many approaches could be taken. For example, the Newton-Raphson method, or gradient ascent could be employed with $\tilde{\tau}$ as a starting point. In one embodiment, Brent's method is used. This has the advantage of not requiring the derivatives of $SS(\tau)$. Brent's method requires three initialisation points, x, y and z, such that $\hat{\tau} \in [x,z]$ and $SS(y)<SS(z)$ and $SS(y)<SS(x)$. $\tilde{\tau}$ and it's adjacent grid points are used for initialisation, that is, $x=\tilde{\tau}-\Delta$, $y=\tilde{\tau}$ and $z=\tilde{\tau}+\Delta$.

G. Numerical Results

Results of Monte Carlo simulations with our new estimator (the minimiser of SS) are presented, with the estimator assuming all symbols are known ($|D|=0$ and $|P|=L$, L being the total number of symbols), and the estimator that only uses the pilot symbols ($|D|=0$). Simulations with the estimator that combines the Oerder-Meyr 'square and filter symbol' timing estimator (see M. Oerder and H. Meyr, "Digital Filter and square timing recovery", IEEE Trans Commun, vol. 36, no. 5, pp. 605-612, May 1988) with the 'high SNR' frame synchronisation algorithm of Massey are also presented. For the simulations the noise $\{w_n\}$ is complex Gaussian with zero mean and independent real and imaginary parts having variance $\sigma^2$. In this setting the estimator that assumes all symbols are known is the maximum likelihood estimator. The signal to noise ratio (SNR) is defined as $$SNR = \frac{E_s}{2\sigma^2}$$

where $E_s=T_s/T$ is the average energy per sample. In this case, it is selected that p=3 and q=17 so the sample period is $$T_s = \frac{3}{17}.$$

The time offset search interval is $[\tau_{min}, \tau_{max}]=[40,70]$, and c=12, so that $$\Delta = \frac{T}{c} = \frac{1}{12}.$$

This corresponds to the grid $$40, 40+\frac{1}{12}, 40+\frac{2}{12}, \ldots, 70-\frac{1}{12}, 70$$

that is searched in order to provide the approximate estimate $\tilde{\tau}$. Brent's method is used to refine $\tilde{\tau}$ to within $10^{-7}$ of $\hat{\tau}$. Monte Carlo simulations are run for SNR between $-17$ dB to 23 dB in steps of 1.5 dB. The number of replications used per experiment is N=2000. N estimates $\hat{\tau}1,\ldots,\hat{\tau}_N$ is obtained, and the mean square error (MSE) is computed according to $$\frac{1}{N}\sum_{n=1}^{N}(\hat{\tau}_n-\tau_0)^2.$$

For each replication the pilot symbols and data symbols are uniformly randomly generated QPSK symbols, the complex amplitude $\alpha_0$ has magnitude one and phase uniformly randomly generated on $[0,2\pi)$, and the time offset $\tau_0$ is uniformly randomly generated on the interval $[\tau_{min}+1, \tau_{max}-1]=[41,69]$ Simulations for L=40 and L=400 are performed. FIGS. 5 to 8 display the results with the number of pilots symbols |P|=5,10,20 when L=40 and |P|=5,10,20,100 when L=400 and when the transmit pulse is a root-raised cosine (RRC) with roll-off ⅓ and period T=1. The pulse is truncated at the 15th zero on the positive and negative real axis. These zeros occur at $t=\pm t_0 \approx 11.635639$ so the pulse is set to zero outside the interval $[-t_0, t_0]$. This truncated pulse is then normalised to have energy 1. In all cases the pilot symbols are arranged in a contiguous block with indices $P=\{1, \ldots, |P|\}$ and the data symbols are arranged in a contiguous block with indices $D=\{|P|+1, \ldots, |D|\}$. As expected, the estimator using only the pilot signal works better when there are more pilot symbols. This estimator performs poorly compared to the other estimators when the number of pilots is small. The performance of our new estimator is poor until the SNR is sufficiently large, a threshold effect is then observed, after which, the performance is not far from the estimator that results when all of the symbols are known in advance. The value of SNR where the threshold occurs appears to depend largely on the number of pilots, and little on the total number of symbols L.

FIGS. 9 to 12 display result under the same conditions as in FIGS. 5 to 8 but where the transmit pulse is now a root-raised cosine with roll-off 1/30 and period T=1. The pulse is now truncated at the 30th zero on the positive and negative real axis. These zeros occur at $t=\pm t_0 \approx 29.59077$ and the pulse is set to zero outside the interval $[-t_0, t_0]$. This truncated pulse is then normalised to have energy 1. In this setting the MSE of the estimator based on the Oerder-Meyr symbol timing estimator and Massey's frame synchroniser is larger than that when the roll-off was ⅓. This is due to the Oerder-Meyr synchroniser being less accurate when the roll-off is small. The behaviour is studied in M. Oerder and H. Meyr, "Digital Filter and square timing recovery", IEEE Trans. Commun., vol. 36, no. 5, pp. 605-612, May 1988, where it is shown that the variance of the Oerder-Meyr synchroniser is inversely proportional to the energy of the signal $|g(t)|^2$ at frequency $$\frac{1}{T}.$$

That is if $$P(f)=\int_{-\infty}^{\infty}|g(t)|^2 e^{-j2\pi ft}dt$$

is the Fourier transform of $|g(t)^2|$, then the variance is inversely proportional to $|P(1/T)|^2$. The value of $|P(1/T)|^2$ can be observed to decrease with the roll-off, making the Oerder-Meyr synchroniser less accurate. By contrast, the new estimator described herein appears to be minimally affected by the change in roll-off.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A method for synchronization of a receiver by estimating a time offset in a received signal by a receiver using pilot symbols and data symbols, the method comprising:
   receiving a signal comprising pilot symbols and data symbols;
   sampling the received signal; and
   processing an optimizing function of the sampled received signal at a finite number of possible time offsets to produce an estimate of the time offset, wherein the optimization function is a function of both pilot symbols and data symbols,
   wherein the optimizing function is processed at the finite number of possible time offsets $\tau_1, \tau_2, \ldots, \tau_K$ for some positive integer K where $\tau_{i+1}-\tau_i=\Delta$, and $\Delta=T/c$ where T is the symbol period of the pilot symbols and data symbols, and c is a positive integer.

2. The method of claim 1, wherein the optimizing function comprises a function of the sampled received signal with a finite number of possible pilots.

3. The method of claim 1, wherein the optimizing function comprises a function of the sampled received signal with a finite number of possible data symbols.

4. The method of claim 1, wherein the optimizing function comprises a mathematical function, or equivalent, of $SS(\tau)=Z(\tau)+Y(\tau)$ where Z is a function of the sampled received signal, the time offset and positions of a finite number of the data symbols, and Y is a function of the sampled received signal, the time offset and positions and values of a finite number of possible pilot symbols.

5. The method of claim 1, wherein the data symbols are complex numbers.

6. The method of claim 1, wherein the data symbols are from a finite set on a complex unit circle.

7. The method of claim 6, wherein the data symbols are from a M-PSK constellations.

8. A method for synchronization of a receiver by estimating a time offset in a received signal by a receiver using pilot symbols and data symbols, the method comprising:
   receiving a signal comprising pilot symbols and data symbols;
   sampling the received signal; and
   processing an optimizing function of the sampled received signal at a finite number of possible time offsets to produce an estimate of the time offset, wherein the optimization function is a function of both pilot symbols and data symbols,
   wherein the step of processing an optimizing function comprises:
   computing $b_k$ for all k=1+c min (P∪D), . . . , K+c max (P∪D), where P is set of indices describing positions of the pilot symbols, D is set of indices describing positions of the data symbols, K and c are positive integers;

computing $Z_k=Z(\tau_k)$, based on $b_k$, for all k=1, ..., K, where $\tau_k$ is a possible time offset;

computing $Y_k=Y(\tau_k)$, based on $b_k$, for all k=1, ..., K, $Y(\tau_k)$ being a different function from $Z(\tau_k)$;

computing k∈{1, ..., K} that maximises $Z_k+Y_k$;

computing an approximate time offset estimate, $\tilde{\tau}$, based on k that maximises $Z_k+Y_k$;

applying a numerical optimization procedure initialized with $\tilde{\tau}$ to produce the estimate of the time offset.

9. The method of claim 8, wherein the step of computing an approximate time offset estimate comprises:

computing $\tilde{\tau}=\tau_1+\Delta(\hat{k}-1)=\tau_{min}+\Delta(\hat{k}-1)$, where k is the k that maximises $Z_k+Y_k$, $\Delta=T/c$ where T is the symbol period of the pilot symbols and data symbols, and c is a positive integer.

10. A non-transitory processor readable medium, comprising instructions for synchronization of a receiver by causing a processor to carry out a method for estimating a time offset in a received signal by a receiver using pilot symbols and data symbols, comprising:

receiving a signal comprising pilot symbols and data symbols;

sampling the received signal; and processing an optimizing function of the sampled received signal at a finite number of possible time offsets to produce an estimate of the time offset, wherein the optimization function is a function of both pilot symbols and data symbols, wherein the optimizing function is processed at the finite number of possible time offsets $\tau_1, \tau_2, \ldots, \tau_K$ for some positive integer K where $\tau_{i+1}-\tau_i=\Delta$, and $\Delta=T/c$ where T is the symbol period of the pilot symbols and data symbols, and c is a positive integer.

11. A receiver comprising:

a receiving module for receiving a signal comprising pilot symbols and data symbols and sampling the received signal; and a processing module comprising a memory and a processor operatively coupled to the memory and configured to carry out a method for synchronization of the receiver by estimating a time offset in the sampled received signal received by the receiving module using pilot symbols and data symbols, the method comprising:

processing an optimizing function of the sampled received signal at a finite number of possible time offsets to produce an estimate of the time offset, wherein the optimization function is a function of both pilot symbols and data symbols, wherein the optimizing function is processed at the finite number of possible time offsets $\tau_1, \tau_2, \ldots, \tau_K$ for some positive integer K where $\tau_{i+1}-\tau_i=\Delta$, and $\Delta=T/c$ where T is the symbol period of the pilot symbols and data symbols, and c is a positive integer.

12. A non-transitory processor readable medium, comprising instructions for causing a processor to carry out a method for synchronisation of a receiver by estimating a time offset in a received signal by a receiver using pilot symbols and data symbols comprising:

receiving a signal comprising pilot symbols and data symbols;

sampling the received signal and processing an optimizing function of the sampled received signal at a finite number of possible time offsets to produce an estimate of the time offset wherein the optimization function is a function of both pilot symbols and data symbols, wherein the step of processing an optimizing function comprises:

computing $b_k$ for all k=1+c min (P∪D), ..., K+c max (P∪D), where P is set of indices describing positions of the pilot symbols, D is set of indices describing positions of the data symbols, K and c are positive integers;

computing $Z_k=Z(\tau_k)$, based on $b_k$, for all k=1, ..., K, where $\tau_k$ is a possible time offset;

computing $Y_k=Y(\tau_k)$, based on $b_k$, for all k=1, ..., K, $Y(\tau_k)$ being a different function from $Z(\tau_k)$;

computing k∈{1, ..., K} that maximises $Z_k+Y_k$;

computing an approximate time offset estimate, $\tilde{\tau}$, based on k that maximises $Z_k+Y_k$;

applying a numerical optimization procedure initialized with $\tilde{\tau}$ to produce the estimate of the time offset.

13. The non-transitory processor readable medium of claim 12, wherein the step of computing an approximate time offset estimate comprises:

computing $\tilde{\tau}=\tau_1+\Delta(\hat{k}-1)=\tau_{min}+\Delta(\hat{k}-1)$, where k is the k that maximises $Z_k+Y_k$, $\Delta=T/c$ where T is the symbol period of the pilot symbols and data symbols, and c is a positive integer.

14. A receiver comprising:

a receiving module for receiving a signal comprising pilot symbols and data symbols and sampling the received signal; and a processing module comprising a memory and a processor operatively coupled to the memory and configured to carry out a method for synchronisation of the receiver by estimating a time offset in the sampled received signal received by the receiving module using pilot symbols and data symbols, the method comprising:

processing an optimizing function of the sampled received signal at a finite number of possible time offsets to produce an estimate of the time offset wherein the optimization function is a function of both pilot symbols and data symbols, wherein the receiving module is further configured such that processing an optimizing function comprises:

computing $b_k$ for all k=1+c min (P∪D), ..., K+c max (P∪D), where P is set of indices describing positions of the pilots symbols, D is set of indices describing positions of the data symbols, K and c are positive integers;

computing $Z_k=Z(\tau_k)$, based on $b_k$, for all k=1, ..., K, where $\tau_k$ is an possible time offset;

computing $Y_k=Y(\tau_k)$, based on $b_k$, for all k=1, ..., K, $Y(\tau_k)$ being a different function from $Z(\tau_k)$;

computing k∈{1, ... K} that maximises $Z_k+Y_k$;

computing an approximate time offset estimate, $\tilde{\tau}$, based on k that maximises $Z_k+Y_k$;

applying a numerical optimization procedure initialized with $\tilde{\tau}$ to produce the estimate of the time offset.

15. The receiver of claim 14, wherein the step of computing an approximate time offset estimate comprises:

computing $\tilde{\tau}=\tau_1+\Delta(\hat{k}-1)=\tau_{min}+\Delta(\hat{k}-1)$, where k is the k that maximises $Z_k+Y_k$, $\Delta=T/c$ where T is the symbol period of the pilot symbols and data symbols, and c is a positive integer.

* * * * *